Figure 1:
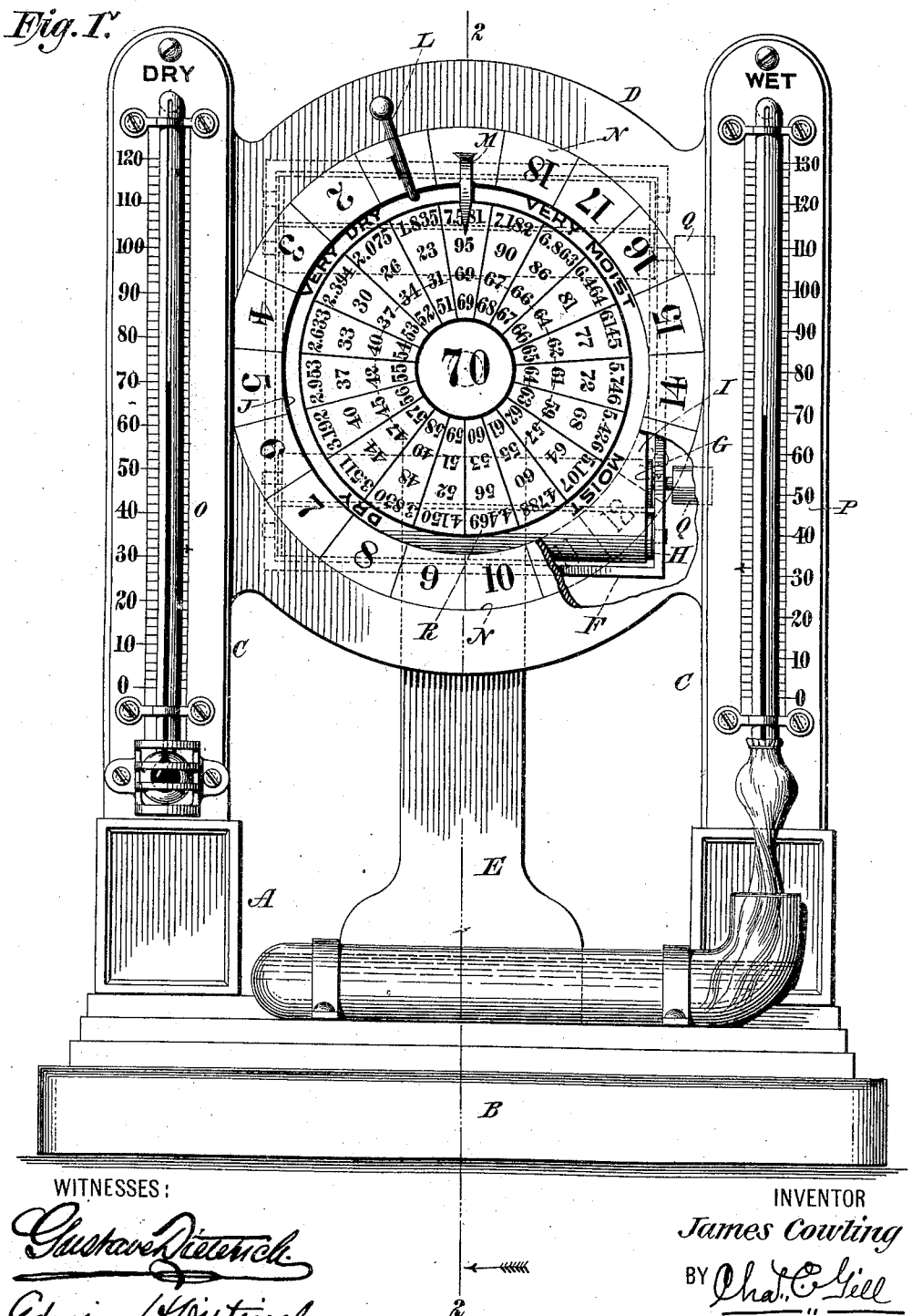

No. 834,660. PATENTED OCT. 30, 1906.
J. COWLING.
HYGROMETER.
APPLICATION FILED JULY 21, 1906.

2 SHEETS—SHEET 1.

WITNESSES:
Gustave Dieterich
Edwin H. Dieterich

INVENTOR
James Cowling
BY Chas. E. Gill
ATTORNEY

No. 834,660. PATENTED OCT. 30, 1906.
J. COWLING.
HYGROMETER.
APPLICATION FILED JULY 21, 1906.

2 SHEETS—SHEET 2.

WITNESSES:
Gustave Dieterich
Edwin H. Dittrich

INVENTOR
James Cowling
BY Chas. C. Gill
ATTORNEY

UNITED STATES PATENT OFFICE.

JAMES COWLING, OF NEW YORK, N. Y.

HYGROMETER.

No. 834,660.  Specification of Letters Patent.  Patented Oct. 30, 1906.

Application filed July 21, 1906. Serial No. 327,141.

*To all whom it may concern:*

Be it known that I, JAMES COWLING, a citizen of the United States, and a resident of New York city, in the county of New York and State of New York, have invented certain new and useful Improvements in Hygrometers, of which the following is a specification.

The invention relates to improvements in hygrometers; and it consists in the novel features, arrangements, and combinations of parts hereinafter described, and particularly pointed out in the claims.

The purpose of my invention is to provide means which may be easily understood and operated and used without liability of mistake for determining with the aid of a wet and a dry bulb thermometer the dew-point, relative humidity, and weight in grains per cubic foot of aqueous vapor present in the atmosphere.

In carrying out my invention I provide an instrument comprising a wet and a dry bulb thermometer and a series of sets of tables in dial form, each set adapted to a degree represented by the dry thermometer and to the conditions which may prevail under the showing at the same time of the wet-bulb thermometer and each set being capable of rotary movement, so that the proper table coinciding with the indications of the dry and wet bulb thermometers may be moved to a definite fixed position and easily read. I prefer to arrange the sets of tables for the different degrees represented on the dry-bulb thermometer one after another upon a strip of flexible fabric, which may be caused to travel upon rollers, so that the proper set of tables for the degree represented for the dry-bulb thermometer may be brought before an opening in the dial or face of the instrument. The rollers carrying the flexible strip I preferably mount in a frame or box which after the proper set of tables has been brought to the face of the instrument may be axially rotated for the purpose of bringing the table corresponding with the showing of the wet-bulb thermometer into line with a fixed index-finger. The tables for each set are arranged radially or in dial or wheel form, so that upon the proper turning of the frame or box carrying the flexible strip the table desired to be used may stand vertically at the upper portion of the instrument and be easily read.

My instrument is simple in construction; and one of its principal objects is to enable a person in a very simple easy manner without calculation or liability to mistake to readily ascertain the relative humidity and other facts contained in hygrometer-tables.

The invention will be fully understood from the detailed description hereinafter presented, reference being had to the accompanying drawings, in which—

Figure 2:
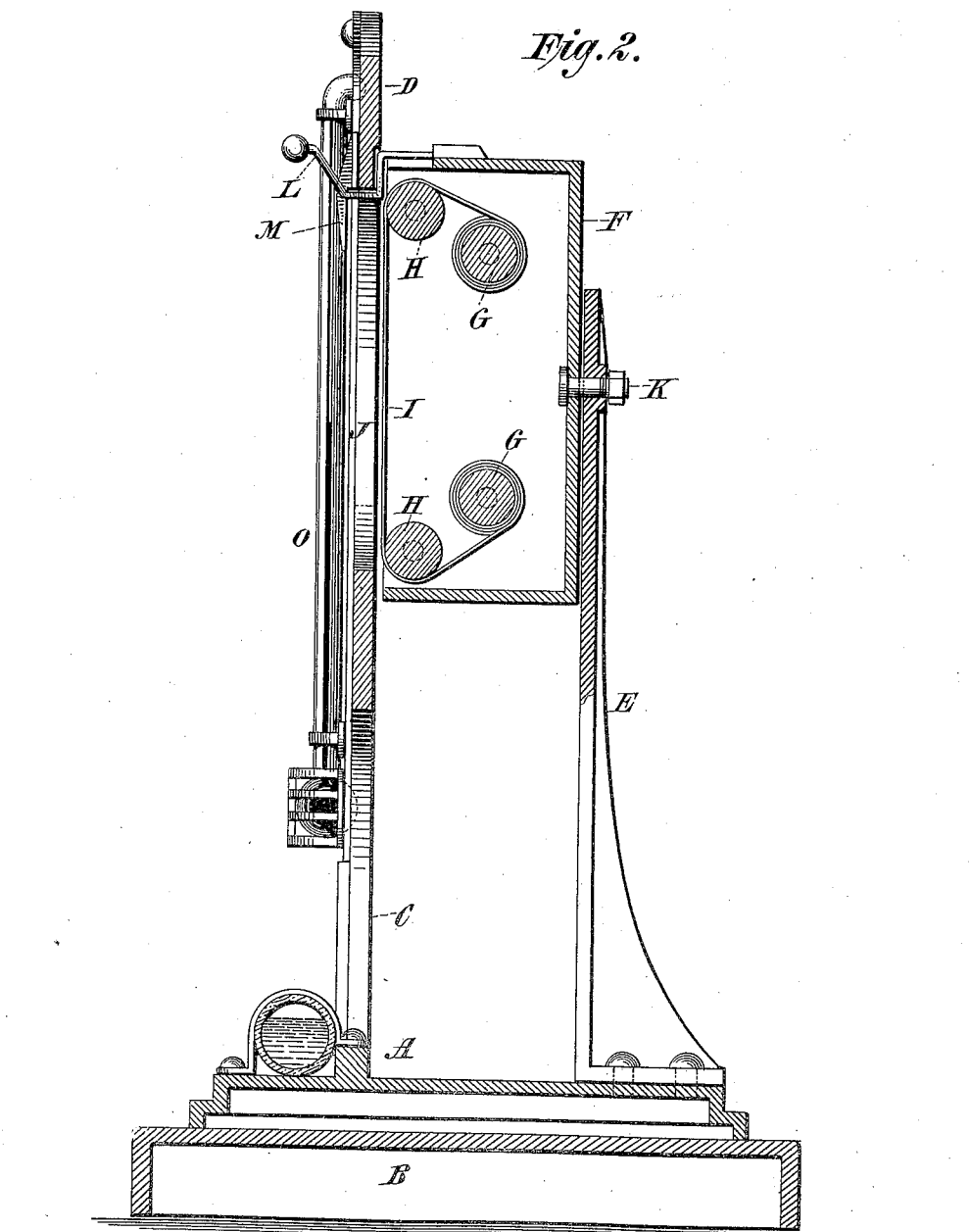

Figure 1 is a front elevation, partly broken away, of a hygrometer or hygroscope constructed in accordance with and embodying my invention; and Fig. 2 is a central vertical section of same on the dotted line 2 2 of Fig. 1.

In the drawings, A denotes the general frame of the machine, comprising the base B, standards C C, a front face or dial portion D, and a rear supporting standard or bracket E, from which and between the same and the face D is pivotally mounted the box F, within which upon rollers G G H H is mounted the flexible strip I, bearing the sets of tables, which as the strip is caused to travel from the upper to the lower rollers or from the lower to the upper rollers may be made to appear in the opening J, formed in the face D, one set of said tables being illustrated in position in Fig. 1. The box F is secured upon a pivot-bolt K and carries a forwardly and outwardly extending arm L, which projects through the circular opening J and is adapted to be moved along the edges thereof.

Upon the face D, I provide a fixed index-finger M and also a circular dial N, encompassing the opening J and bearing a series of equally-spaced numerals running, preferably, from "1" to "18," inclusive, which guide the user of the device in the movement of the arm L for setting the box F and the set of tables which may then be at the opening J in proper position with respect to the fixed index-finger M.

Upon the standards C C are mounted the dry and wet bulb thermometers O P, respectively, these thermometers being of well-known character and construction and requiring no special description.

The strip of fabric I may be of any length desired and is fastened at its ends to the rollers G G and adapted to travel over the rollers H H, which maintain a definite stretch of the fabric parallel with the front of the hygrometer and in line with the opening J. The rollers G G are provided with exposed knobs or handles Q Q, by which they may be rotated to compel the travel of the fabric from the upper roller G to the lower roller G, or from the lower roller G to the upper roller G.

The strip of fabric I bears a series of sets of tables arranged radially in radial spaces upon a circular field at whose center is provided a circular space bearing a numeral, as shown in Fig. 1, each of the tables being adapted to stand vertically below the stationary index-finger M when brought to that point by the manual rotation of the box F. The large numerals at the center of the sets of tables, as "70" in Fig. 1, correspond with the degrees appearing on the dry thermometer. One set of the tables is shown in Fig. 1; but the strip I may bear as many sets of tables as may be desired, each set corresponding in general arrangement with the set shown in Fig. 1 and differing therefrom only in the numerals displayed thereon. In Fig. 1 is shown the set of tables which must be used when the dry-bulb thermometer stands at "70," and the other sets of tables carried by the strip I will each bear the proper tables for use with the successive indications that may be given by the dry-bulb thermometer. The sets of tables are each in dial form, as shown in Fig. 1, and I will preferably provide the strip with fifty of these sets of tables arranged for use with the dry and wet bulb thermometers and respectively adapted to, say, from fifty to one hundred degrees, inclusive, on the dry thermometer, the sets of tables necessarily varying in their numerals in accordance with the degree of the dry thermometer that may be shown at the center thereof. With reference to Fig. 1 it will be seen that the radial tables differ in their indications from each other and are in line with the numerals on the circular dial N and that each of said tables comprises four lines of numerals. The inner numeral of each of the radial tables is for use in connection with the wet-bulb thermometer, the next outer numeral represents the "dew-point," the next outer numeral denotes the percentage of humidity, or, as commonly termed, the "relative humidity," and the outer line of numerals of each table gives the weight in grains per cubic foot of aqueous vapor.

In the employment of the hygrometer the user will first ascertain the degree represented on the dry-bulb thermometer and then effect the travel of the strip I until the set of tables bearing the degree shown by said thermometer appears at the opening J in the front of the instrument, and we may assume that in the present instance said thermometer stood at "70" and the user had caused the travel of the strip I until the set of tables bearing the numeral "70" at the center thereof appeared at the opening J, this being the condition represented in Fig. 1. The purpose of the instrument being to determine the relative humidity or the dew-point or the weight in grains per cubic foot of aqueous vapor, or all of these facts, the user will then observe the wet-bulb thermometer, finding in the present instance that it stands at "69," and note that there is but one degree of difference between the wet and dry thermometers, and in such instance he will allow the arm L to remain at the numeral "1" on the dial N, since under such condition the proper table will be directly below the fixed index-finger M, the "69" in said table corresponding with the wet-bulb thermometer, which is an assurance to the user that the proper table is below said index-finger M, and said table giving the dew-point as "69," the relative humidity as "95," and the weight in grains per cubic foot of aqueous vapor as "7.581." If, however, instead of the wet-bulb thermometer standing at "69" it had stood at "60," the user, observing that there were ten degrees of difference between the wet and dry thermometers, would grasp with his finger and thumb the arm L and move the same along the edge of the opening J just ten points, or until said arm reached the numeral "10" on the circular dial N, the effect of this being that the box F would be rotated on the bolt K, and the table lettered R would be turned until it stood vertically directly below the stationary index-finger M, said table at its then lower figure showing the numeral "60," corresponding with the degree given on the wet-bulb thermometer, at its next outer numeral "53" disclosing the dew-point, at its next outer numeral "56" giving the relative humidity, and at its outer or top indication "4.469" giving the weight in grains per cubic foot of aqueous vapor. Whenever the dry thermometer stands at "70," the set or wheel of radial tables bearing at its center the numeral "70" will be made use of regardless of how the wet-bulb thermometer may at the time stand. In Fig. 1 I illustrate the relative positions of the parts when there is but one degree of difference between the wet and dry bulb thermometers and have explained the simple step to be performed when there are ten degrees difference between the wet and dry bulb thermometers. The user of the instrument will always ascertain the difference between the showings of the wet and dry bulb thermometers and rotate the box F to a corresponding extent, so as to bring the table proper for the degree shown by the wet-bulb thermometer directly below the index-finger M, and the table thus presented below said index-finger will always give the dew-point, relative humidity, and weight in grains per cubic foot of aqueous vapor under the conditions determined by the dry and wet bulb thermometers.

It will be observed that the operation of the instrument is a very simple one and easily understood and that it is practically impossible for any one to make any mistake in ascertaining the relative humidity, dew-point, and weight in grains. The inner numeral of each table corresponding with the degree shown by the wet-bulb thermometer is always an assurance that the proper table is below the index-finger M, and the presence of this numeral would be a sufficient guide to many persons in turning the box F to the correct position without the employment of the circular dial N; but for completeness I prefer to make use of the circular dial N and utilize the arm L as the index-arm for this circular dial and also as the means for rotating the box F, carrying the strip I, said box being simply a frame supporting the rollers carrying the strip I and not necessarily being closed at its top and bottom, but preferably closed for the purpose of excluding light and dust from the fabric I.

My invention thus presents a simple and easily-operated means capable of ready and accurate use for determining the dew-point, relative humidity, and weight in grains per cubic foot of aqueous vapor under any of the various conditions represented by the dry and wet bulb thermometers, leaving nothing for mathematical calculation or reference to other tables and avoiding any likelihood of the user of the instrument making any mistake in his reading thereof, which is a matter of vital importance, since in instruments heretofore provided for determining relative humidity the user, due to the complexity of the reading parts, is liable to make mistakes in the reading thereof.

What I claim as my invention, and desire to secure by Letters Patent, is—

1. In an instrument of the character described, a dry and a wet bulb thermometer, and a series of sets of hygrometer-tables each adapted to be held in an exposed position and each adapted to a definite reading of the dry-bulb thermometer, each of said sets being in dial form and bearing a character denoting the reading of the dry-bulb thermometer to which it is adapted, combined with means for holding said tables, means for bringing the proper set of tables to the front and means permitting the rotation of the tables to bring the proper table of a set to a definite reading-point, in accordance with the reading of the wet-bulb thermometer; substantially as set forth.

2. In an instrument of the character described, a dry and a wet bulb thermometer, and a series of sets of hygrometer-tables each adapted to be held in an exposed position and each adapted to a definite reading of the dry-bulb thermometer, each of said sets being in dial form and bearing a character denoting the reading of the dry-bulb thermometer to which it is adapted, and each table of each set bearing a character denoting the reading of the wet-bulb thermometer to which the table is adapted, combined with means for holding said tables, means for bringing the proper set of tables to the front and means permitting the rotation of the tables to bring the proper table of a set to a definite reading-point, in accordance with the reading of the wet-bulb thermometer; substantially as set forth.

3. An instrument of the character described comprising a supporting-frame having in its face a circular reading-opening surrounded by a dial having a series of equidistant spaces, a wet and a dry bulb thermometer, a rotary frame in rear of said opening and carrying rollers, an arm connected with said frame and extending forwardly into coöperative relation with said dial, and a strip of fabric mounted on said rollers and adapted to travel across said opening upon the rotation of said rollers, said strip bearing a series of sets of hygrometer-tables each set adapted to said opening and to a definite reading of the dry-bulb thermometer and bearing a character denoting the reading of the dry-bulb thermometer to which it is adapted, said dial denoting the extent to which said rotary frame must be turned, in accordance with the difference between the readings of the dry and wet bulb thermometers, to bring the proper table of the set to the reading-point; substantially as set forth.

4. An instrument of the character described comprising a supporting-frame having in its face a circular reading-opening surrounded by a dial having a series of equidistant spaces, a wet and a dry bulb thermometer, a rotary frame in rear of said opening and carrying rollers, an arm connected with said frame and extending forwardly into coöperative relation with said dial, and a strip of fabric mounted on said rollers and adapted to travel across said opening upon the rotation of said rollers, said strip bearing a series of sets of hygrometer-tables each set adapted to said opening and to a definite reading of the dry-bulb thermometer and bearing a character denoting the reading of the dry-bulb thermometer to which it is adapted, and each table of each set bearing a character denoting the reading of the wet-bulb thermometer to which the table is adapted, said dial denoting the extent to which said rotary frame must be turned, in accordance with the difference between the readings of the dry and wet bulb thermometers, to bring the proper table of a set to the reading-point; substantially as set forth.

Signed at New York city, in the county of New York and State of New York, this 19th day of July, A. D. 1906.

JAMES COWLING.

Witnesses:
CHAS. C. GILL,
ARTHUR MARION.